Feb. 24, 1931.        G. C. FARRILL        1,793,919
COMBINATION HARROW
Filed Sept. 9, 1929        2 Sheets-Sheet 2
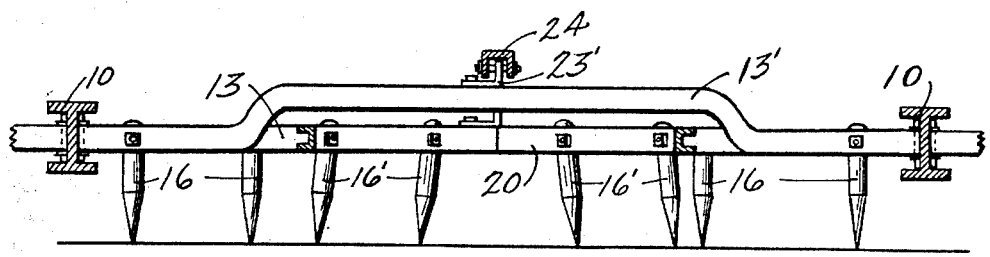
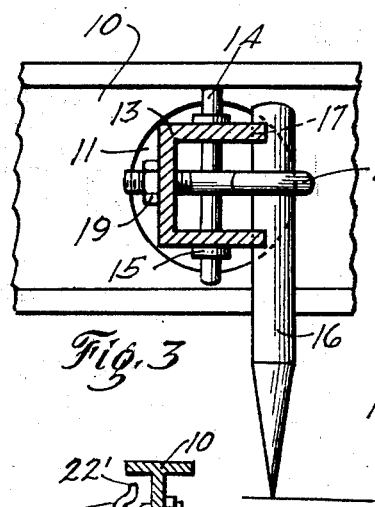
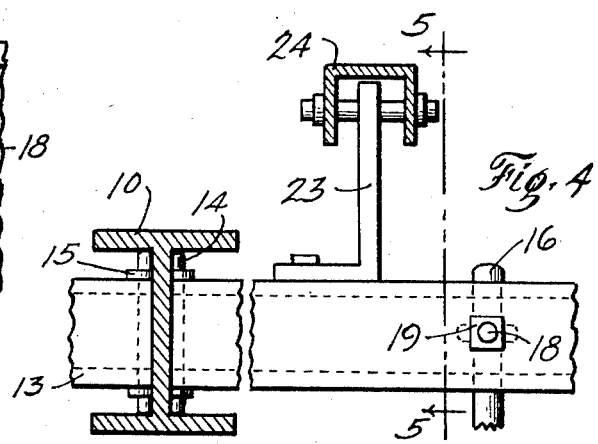
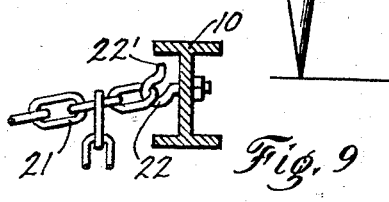
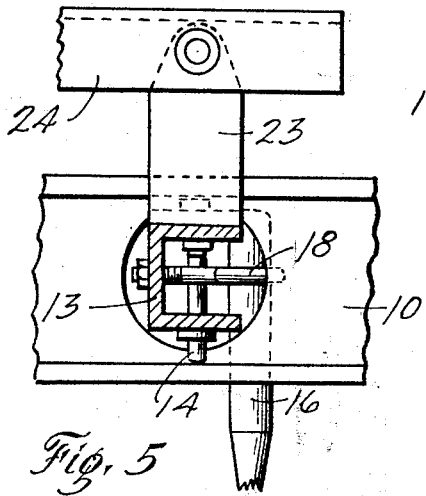
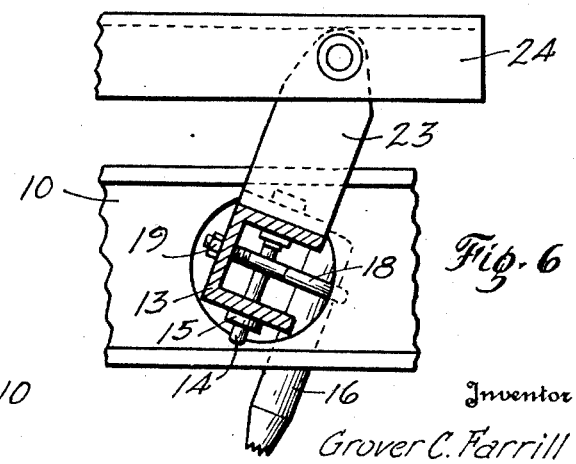
Inventor
Grover C. Farrill
By Jack Atchley
Attorney Patented Feb. 24, 1931

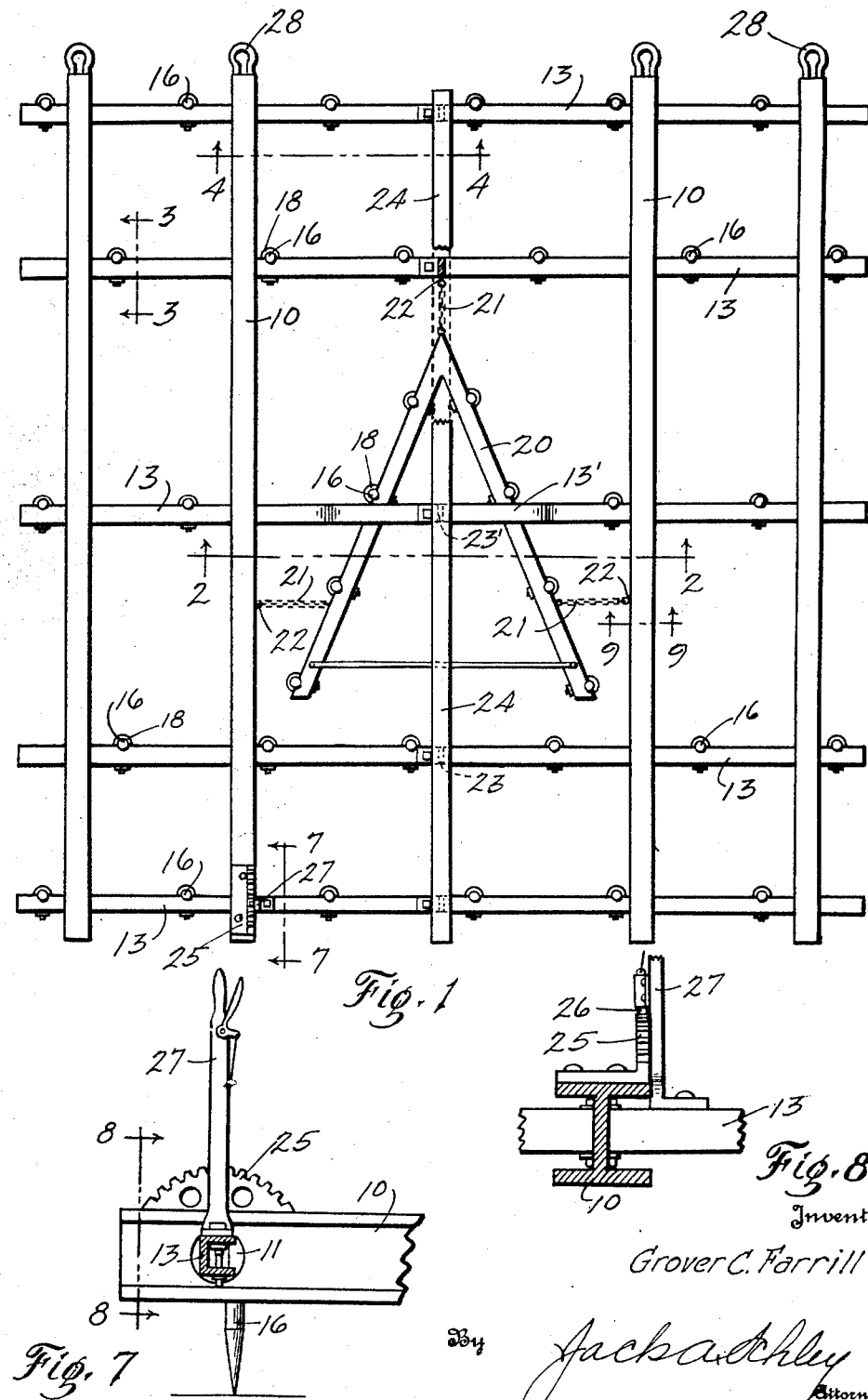

1,793,919

UNITED STATES PATENT OFFICE

GROVER C. FARRILL, OF DALLAS, TEXAS, ASSIGNOR OF TWENTY PER CENT TO FRANK LADYMON, OF DALLAS, TEXAS

COMBINATION HARROW

Application filed September 9, 1929. Serial No. 391,490.

This invention relates to new and useful improvements in combination harrows.

One object of the invention is to provide a harrow designed for use on uneven land and particularly for harrowing the furrows and the sides of the rows, as well as the ridges of the rows.

A particular object of the invention is to provide a harrow comprising a main body provided with harrowing teeth and a harrowing section flexibly attached to the body so as to drop below the body and harrow furrows, depressions or uneven places in the land.

A further object of the invention is to provide a flexibly suspended harrow section arranged and shaped to harrow the sides as well as the bottom of a furrow or other land depression.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a plan view of a harrow constructed in accordance with the invention, Figure 2 is an enlarged transverse sectional view taken on the line 2—2 of Figure 1, Figure 3 is a detail of the cross bar and tooth mounting, Figures 4, 5 and 6 are details of the cross bar adjusting means, and Figures 7 and 8 are details of the lever mechanism for actuating the cross bar adjusting means, and Figure 9 is a vertical section taken on the line 9—9 of Figure 1.

In the drawings the numeral 10 designates longitudinal beams with circular openings 11 provided therein for receiving cross bars 13. The cross bars are held against horizontal displacement by means of pins 14 secured in the bars on each side of the beams and adjacent thereto. The pins are held in place by lock washers 15 and are of sufficient length to extend beyond the rims of the openings and still permit the rotatable movement of said cross bars within the openings.

Harrow teeth 16 are mounted on the cross bars in grooves 17, provided for the purpose, and rigidly secured thereon by eye bolts 18 which extend through said cross bars and are secured thereto by nuts 19. A triangular section 20 is loosely suspended in the center of the harrow by flexible connections secured to both sides and to the forward end. The flexible connections comprise adjustable chains 21 suitably secured to the triangular section and connected to the hooks 22 which are secured on the sides to the beams and at the forward end to a cross bar.

The hook 22 has an upright extended end 22' (Figure 9) which forms a guard and prevents the chain from slipping accidentally off the hook. The triangular section being loosely suspended by adjustable chains may be adjusted for harrowing normally deep furrows or depressions or normally shallow furrows or depressions, as said section will lower itself into said furrows when the harrow is dragged over them, thereby cultivating the sides and bottom as well as the ridges of the furrows.

The center cross bar is arched at 13' over the triangular section so that said section may be raised flush with the rest of the harrow, thereby allowing for the use of this harrow in the cultivation of level soil, as well as furrowed soil. Harrow teeth 16' are mounted on the triangular section, preferably in a slight rearwardly inclined position, giving them a small pitch which will allow for the freeing of trash.

Angular arms 23 are rigidly secured to the top of the cross bars in longitudinal alinement for the pivotal mounting thereon of a longitudinal adjusting bar 24. The angular arms are of sufficient height to allow the adjusting bar to clear the arched portion of the center cross bar to which it is pivotally attached by a shorter angular arm 23'.

At the rear end of the adjusting bar and immediately over the rear cross bar, a locking segment 25 is rigidly mounted for engaging a plunger 26 of an adjusting lever 27. Said lever is rigidly secured to the rear cross bar so that when the lever is tilted the cross bar is also tilted, thereby allowing the attached teeth to be set at a desired pitch for the freeing of trash when dragged over the ground, as is shown in Figure 6. As the cross bars are all pivotally connected by the adjusting bar they will be synchronously tilted with the rear cross bar, thereby giving their attached teeth the desired pitch. Clevises 28 are secured to the forward end of the beams for the convenient attaching of suitable dragging means to the harrow.

Various changes in the size and shape of the different parts, as well as modifications and alterations, may be made within the scope of the appended claims.

What I claim, is:

1. In a combination harrow, a main body comprising longitudinal beams and cross bars journaled on the beams, teeth mounted on the cross bars, and a harrow section having teeth and flexibly suspended between the beams at the center of the body and intermediate the cross bars.

2. In a combination harrow, a main body comprising longitudinal beams and cross bars journaled on the beams, teeth mounted on the cross bars, a triangular shaped harrow section having depending teeth, and flexible connections attached to two of the beams and one of the cross bars for suspending the section.

3. In a combination harrow, a main body comprising longitudinal beams and cross bars journaled on the beams, teeth mounted on the cross bars, a triangular shaped harrow section having depending teeth, and flexible connections attached to two of the beams and one of the cross bars for suspending the section, the flexible connections consisting of adjustable chains and of hooks for receiving said chains.

4. In a combination harrow, a main harrow body including transverse bars, one of said bars being arched at the central portion of the body, teeth depending from said bars, and a harrow section having teeth and flexibly suspended from the body under said arched bar for dropping into depressions below the ground on which the teeth of the main body rest, or for rising to work on level ground under said arched bar.

In testimony whereof I affix my signature.

GROVER C. FARRILL.